United States Patent [11] 3,611,332

[72] Inventor Allan Slater
Philadelphia, Pa.
[21] Appl. No. 844,121
[22] Filed July 23, 1969
[45] Patented Oct. 5, 1971
[73] Assignee The United States of America as represented by the Secretary of the Navy

[54] UNDERWATER TEMPERATURE TELEMETRY SYSTEM
5 Claims, 8 Drawing Figs.

[52] U.S. Cl. 340/207, 340/347 AD, 340/203, 325/39, 325/141, 323/22 T
[51] Int. Cl. G08c 19/16
[50] Field of Search 340/207, 183, 177, 3, 4, 15.5, 18 FM, 347 AD; 128/2.1 A; 325/39, 40, 141; 323/22 T

[56] References Cited

UNITED STATES PATENTS

| | | | |
|---|---|---|---|
| 2,928,900 | 3/1960 | Pawley | 340/183 |
| 3,210,747 | 10/1965 | Clynes | 340/206 |
| 3,344,340 | 9/1967 | Webb | 323/22 T |
| 3,419,789 | 12/1968 | Gately | 323/22 T |
| 3,445,840 | 5/1969 | Carlstead | 340/347 |
| 3,509,449 | 4/1970 | Andren | 323/22 T |
| 3,522,521 | 8/1970 | Lloyd | 323/22 T |
| 3,527,999 | 9/1970 | Weinberger | 323/22 T |

*Primary Examiner*—John W. Caldwell
*Assistant Examiner*—Robert J. Mooney
*Attorneys*—R. I. Tompkins, L. I. Shrago and R. K. Tendler ABSTRACT: A self-contained underwater telemetry system is provided for transmitting biophysical data from a freeswimming diver through the water to a receiving station. The system includes a pulse amplitude modulated FM transmitter carried on the diver and an FM receiver with an FM-to-pulse amplitude demodulation section. Also included are a precision oscillator whose frequency is controlled by sensor resistance; multiplexing circuits for monitoring several channels of biophysical information; an octal encoding system which generates the above-mentioned pulse amplitude modulated signal; a low drain voltage regulator; a hydrophone-tuned amplifier combination; and a zero crossover-multivibrator demodulation section for the FM receiver.

INVENTOR.
ALLAN SLATER

INVENTOR
ALLAN SLATER

POWER SUPPLY REGULATOR

INVENTOR
ALLAN SLATER

HYDROPHONE

CROSS OVER DETECTOR

INVENTOR
ALLAN SLATER

UNDERWATER TEMPERATURE TELEMETRY SYSTEM

The invention described herein may be manufactured and used by or for the Government of the United States of America for governmental purposes without the payment of any royalties thereon or therefor.

This invention relates to underwater telemetry and, more specifically, to a multiple channel portable telemetry unit carried by a freeswimming diver for measuring biophysical parameters and for underwater communication.

The system utilizes a multiplicity of input channels to sequentially control a precision resistance controlled oscillator. The output of this oscillator is octally encoded and the octal digits are sequentially sampled so as to produce a series of pulse amplitude modulated signals. These signals modulate an FM transmitter which generates FM acoustic signals in the water. The FM transmission is detected by a hydrophone which includes a tuned amplifier located adjacent to the acoustic receiving transducer. An amplified portion of the detected signal is coupled to a zero crossover detector and a monostable vibrator which duplicates the pulse amplitude modulation (PAM) of the FM transmitter. Included in the system are low-drain power supply regulators for use with the transmitting unit to provide the precision oscillator and other critical circuits with constant plus and minus voltage.

Recent developments in undersea technology now allow divers to remain underwater for significant periods of time and at significant depths. Difficulties have recently been experienced by divers in adapting to such a hostile environment. It is therefore important that the life processes of a diver be monitored when he operates at great ocean depths. Because of the salinity of the environment, radio frequency telemetry is limited in range for the amounts of power which can be carried by the diver. Wire data transmission systems hamper the ability of the diver to carry out his assigned tasks and occasionally become dangerous if the diver becomes entangled. Acoustic telemetry systems using simple amplitude modulation are susceptible to multipath variations in amplitude of the received signal and thus are not reliable beyond several tens of yards.

The subject system overcomes the power requirement limitations and enables a multiplicity of channels of biophysical information to be monitored at distances up to several miles. The system disclosed utilizes a minimum of power allowing battery-size reduction, occupies a minimum of space and is noteworthy for its lightweight and simplicity.

The parameters that can be telemetered by this system are those which can be reduced to changes in resistance. These changes are easily generated by resistors which change their resistance in response to a changed parameter. Body temperature of a diver over a prolonged period is one of the most easily monitored parameters since it can be monitored by a series of thermistors attached to his skin. As another parameter, exhaled gas mixture content can be monitored with a voltage-sensitive chemical probe.

The telemetry system employs a series of subsystems or components whose use in the system reduces power requirements and increases the system reliability. Among the subsystems to be described in detail are the FM transmitter, the PAM multiplexing system, the low drain power supply regulator and the telemetry receiving system which includes a hydrophone-amplifier combination with a single center conductor coaxial cable which simultaneously brings power to the amplifier and amplified signal to the receiver, a power supply and an FM demodulating section.

It is therefore an object of this invention to provide an underwater telemetry system for use by a freeswimming diver in the monitoring of his biomedical processes.

It is a further object of this invention to provide a multichannel telemetry system which generates an octally encoded pulse amplitude-modulated signal.

It is another object of this invention to provide an efficient FM transmitter for use in an underwater telemetry system which is modulated by a PAM signal.

It is a still further object of this invention to provide an underwater telemetry system with a precision resistance-controlled oscillator and an efficient low-drain power supply regulator.

It is still another object of this invention to provide an FM receiving system including a hydrophone-tuned amplifier input stage, a single cable system for this stage and a zero crossover detector-multivibrator demodulation section.

Other objects, advantages and novel features of the invention will become apparent from the following detailed description thereof when considered in conjunction with the accompanying drawings in which like numerals represent like parts throughout and wherein.

Figure 1:
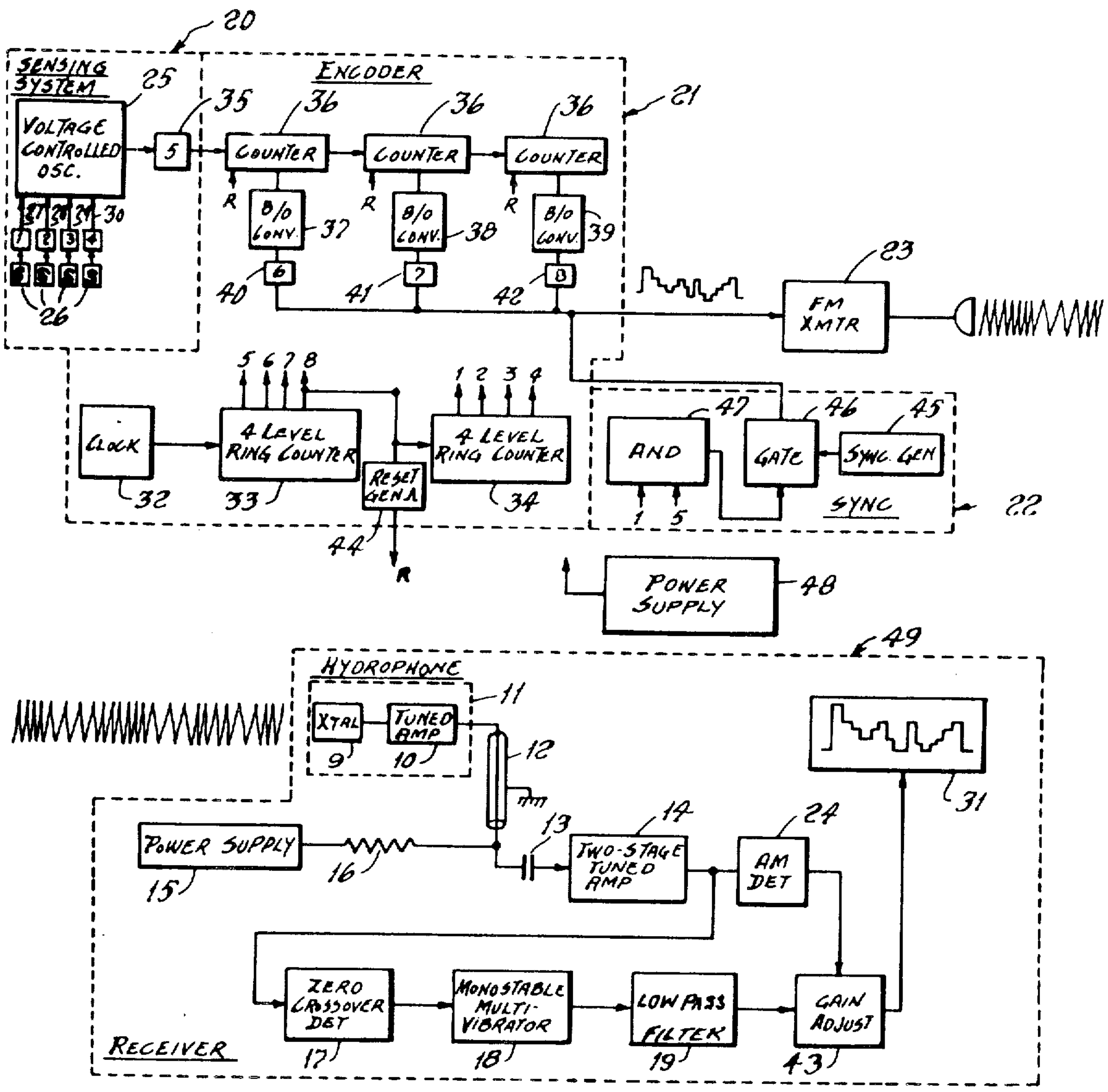
FIG. 1 is a block diagram of the entire telemetry system.
Figure 6:
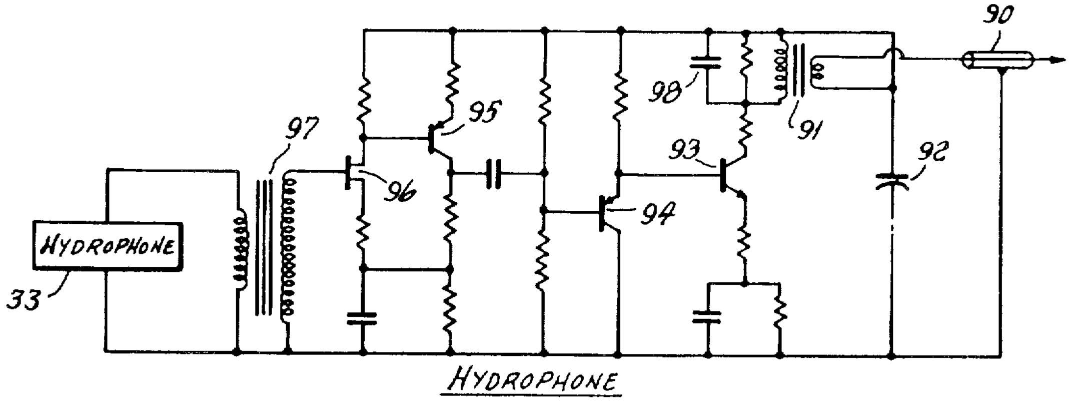
Figure 7:
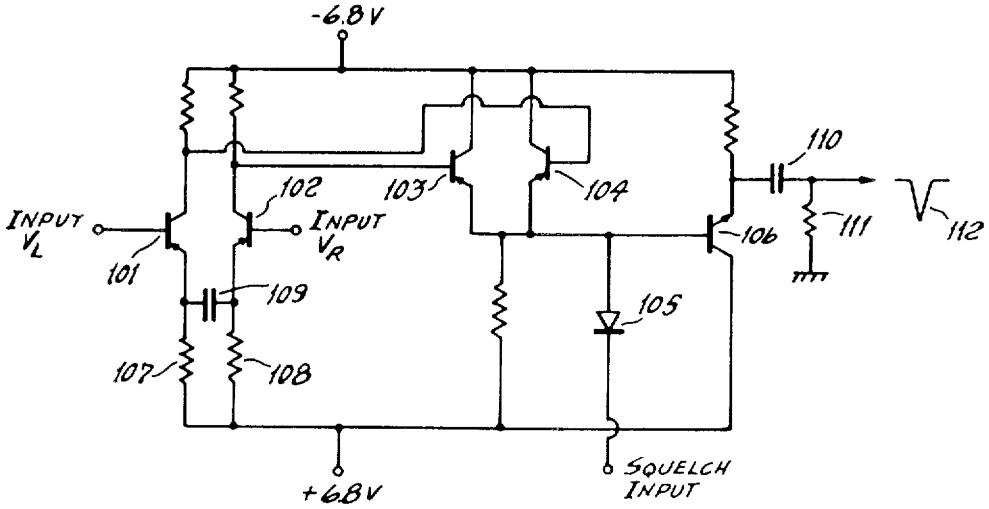

FIG. *5a* is a schematic diagram of the power supply regulator used by the power supply shown in FIG. 1;

FIG. *5b* is a portion of a standard regulator circuit;

FIG. 6 is a schematic diagram of the tuned amplifier used with the crystal transducer shown as the hydrophone in FIG. 1; and FIG. 7 is a schematic diagram of the crossover detector shown in FIG. 1.

THE TELEMETRY SYSTEM

Referring to FIG. 1, a complete diagram of the underwater telemetry system is shown including the FM transmitting and receiving systems. The transmitting system is characterized by a sensing unit 20, an encoding section 21, a sync circuit 22 and a pulse amplitude-modulated FM transmitter 23.

In one embodiment the subject telemetry system monitors the body temperature of a freeswimming diver. The system will be described as being utilized for this type of measurement although it will be appreciated that any slowly varying parameters which can be measured by changes in resistance or voltage may be encoded and telemetered by the subject system.

The sensing unit is composed of a precision voltage-controlled oscillator 25 which generates a stream of pulses whose frequency is controlled by one of four thermistors 26. Each one of these four thermistors is gated sequentially to oscillator 25 by gates 27, 28, 29 and 30. These gates are activated by pulses 1, 2, 3 and 4, respectively, from four-level ring counter 34 so that each of the thermistors is connected to the oscillator during a sampling cycle. This ring counter is driven by a four-level ring counter 33 which is coupled to a clock generator 32. This counter produces pulses 5, 6, 7 and 8. Each of the thermistors causes the oscillator to oscillate at a frequency dependent upon its resistance which is related to the temperature sensed. The output of the oscillator is gated at 35 by output 5 from ring counter 33. This pulse is referred to as "pulse 5." Gate 35 passes the output of oscillator 25 to cascaded binary counters 36 for the length of "pulse 5." Thus, for each thermistor the number of oscillations counted during pulse interval 5 is a precise function of the temperature sensed. Binary counters 36 which then hold this number are octave counters having three bit storage capacities to facilitate a binary-to-octal conversion.

Each counter output is converted to a voltage proportional to an octal digit by binary-to-octal converters 37, 38 and 39. The octal value of each of the converters is sequentially coupled to the FM transmitter 23 by gates 40, 41 and 42 which are activated by pulses 6, 7 and 8 of counter 33. Pulse 8 also serves to reset counters 36 and advance counter 34. Resetting is facilitated by the production of a spiked pulse generated at the end of pulse 8. This pulse is generated by a conventional reset generator 44. During each cycle of counter 33, the value of one thermistor is converted to a three digit octal number represented by three pulses of varying amplitude corresponding to the resistance value of the thermistor being sampled. At the beginning of each telemetry cycle and just prior to the first sampling period, a sync pulse is transmitted to the FM transmitter 23. This is a pulse having a height equal to the maximum output of the system. This sync pulse is located just prior to the first character of the first sampled thermistor and identifies which of the four thermistors is being read as well as signifying the first of the three place values for the first thermistor. The sync circuit is composed of a generator 45 which produces a fixed voltage corresponding in level to the maximum pulse height generated by the PAM system. This sync pulse is coupled to gate 46. A single pulse from this generator is allowed to pass to FM transmitter 23 when pulses 5 and 1 from counters 33 and 34 are simultaneously generated. This condition is sensed by a conventional AND gate 47 which energizes gate 46 so as to pass the pulse from generator 45 to FM transmitter 23.

Figure 2:
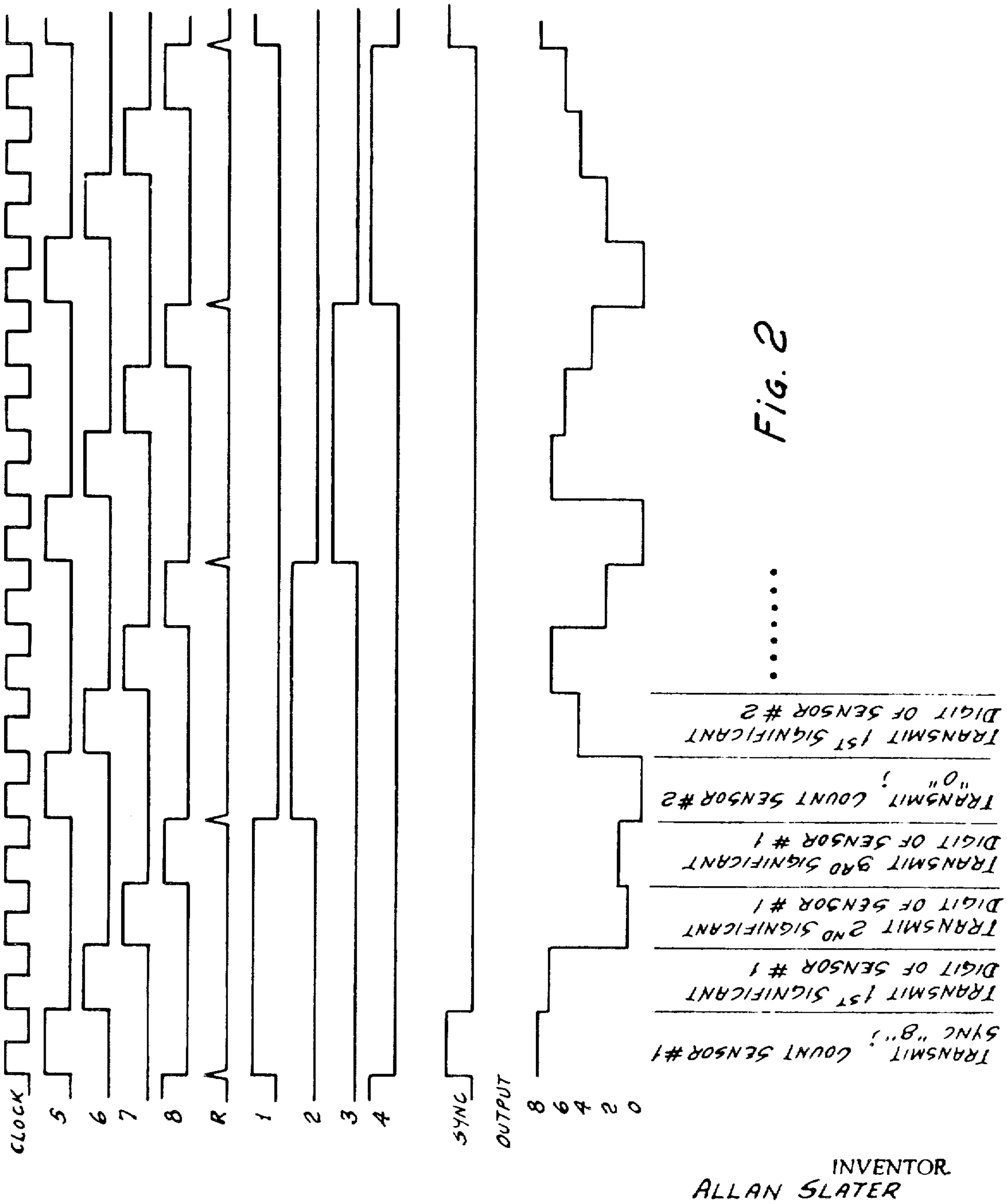
FIG. 2 is a timing and event diagram for the pulse amplitude modulation multiplexing system shown as the encoder of FIG. 1.

The input to transmitter 23 is shown diagrammatically at the bottom of FIG. 2. The start of the modulating sequence is noted by a sync pulse of amplitude "8" followed by three-pulse digits. The amplitude of each of the pulses in each three-pulse sequence indicates the octal number in each of converters 37, 38 and 39. Each sequence thus indicates a three-place octal number which is directly related to the temperature sensed by the thermistor being read out. As such, the input to FM transmitter 23 constitutes pulse amplitude modulation (PAM). Oscillator 25, transmitter 23 and the power supply shown at 48 will be discussed in detail hereinafter.

Transmitter 23 transmits an FM signal into the water surrounding the diver. Because of the coherence of the FM signal, an omnidirectional acoustic transducer may be used. It will be appreciated that the range of the subject system is a function of noise in the water and the water geometry. In the subject system an acoustic signal has been detected beyond a mile from the diver by receiving system 49. In one configuration a crystal hydrophone 9 coupled to a tuned amplifier 10 detects the FM signal. These two components comprise a hydrophone assembly 11 to be described in detail later in the specification. This amplifier is powered through a coaxial line 12 which serves to bring the signal from the hydrophone through capacitive coupling 13 to a two-stage tuned amplifier 14. Power is delivered to hydrophone 11 through the central conductor of the coaxial cable by power supply 15 and resistor 16. The output of amplifier 14 is an FM signal. This signal is coupled to zero crossover detector 17 also described later in detail. The output of this detector is a series of pulses indicating the zero crossovers of the incoming signals. These pulses drive a one-shot multivibrator 18 whose average output voltage is proportional to the frequency of the frequency of the drive pulses. A low-pass filter 19 extracts this average value which constitutes recovered information. The output of filter 19 is coupled to a squelch circuit which is part of gain adjust 43 which turns off the receiver output when the input signal falls below a minimum amplitude as detected by AM detector 24 coupled to the output of amplifier 14. In one embodiment this squelch circuit interrupts the output of the low-pass filter. The receiver output from the gain adjust is coupled to a display device 31 which may be a conventional strip chart recorder or an oscilloscope. The value of the digits can be read off this chart and the temperature determined by use of conversion tables. The output of the receiver may alternately be fed to a general purpose computer for a direct computation of the temperature telemetered by the subject system.

It will be appreciated that the telemetry system described has broad application and is not limited to temperature telemetry. By altering the size of counters 33 and 36, the number of digits and, therefore, the resolution can be altered. More channels of information can be provided by changing the size of counter 34 and the number of gates to oscillator 25. The information need not be of the same parameter and thus multiple biophysical parameters of a freeswimming diver may be monitored.

FIG. 2 is a pulse-timing diagram of the telemetry system shown in FIG. 1. The top line of the diagram is the clock pulse train produced by clock 32 of FIG. 1. In one experimental configuration, the clock pulse rate was four pulses per second which caused the telemetry system to cycle one thermistor a second. However, other data or pulse rates are feasible with this system. The next four lines of the diagram indicate the output pulses from counter 33 which is a conventional four-level ring counter. Since counter 34 is cascaded with counter 33, in order to obtain a subsequent pulse, counter 33 must run through all of its possible states. This makes the pulse lengths in counter 34 four times the pulse lengths in counter 33. The lines 1, 2, 3 and 4 of FIG. 2 show this increased length. Also indicated is the time when data is collected in counters 36. The thermistors are coupled to the precision oscillator for the entire interval indicated by the pulses 1, 2, 3 and 4 from counter 34. However, the output of this oscillator is only gated to counters 36 during the "pulse 5" time interval. The sensor being sampled is indicated in the timing diagram. At the termination of "pulse 5," the counter and, therefore, the binary-to-octal converters contain the number of pulses generated by the precision oscillator. The converters 37, 38 and 39 are sampled sequentially and "dump" their information in to transmitter 23 of FIG. 1 during the intervals indicated in the timing diagram. After transmission of the three digits, reset generator 44 resets the counters with pulse R and the cycle then repeats with the next sensor.

The line after line 4 shows the level "8" sync pulse. The combined signal to FM transmitter 23 is shown on the bottom line. It is noted that before each reading of a triplet of octal values the modulation drops to zero thus separating the readings. This is true except for the first reading which is immediately preceded by the above-mentioned sync pulse.

The above telemetry system provides a lightweight, compact, portable system characterized by reliable signal transmission with a low drain on the power supply. It is not subject to multipath distortion nor to excessive attenuation associated with radio frequency transmission devices. The components which enable the production and reception of an efficient telemetry signal are as follows.

THE FM TRANSMITTER

As mentioned before, frequency modulation in this application is better adapted for use in underwater communications because reception of FM transmissions is little affected by multipath propagation. Acoustic properties of water dictate the optimum transmission frequency. At high frequencies, excessive attenuation reduces range. At low frequencies, acoustic noise in the water interferes with the received signal. Another constraint on the usable frequencies is the requirement that the frequency must be above the audible range so as not to distract the diver. These factors lead to the choice of a center frequency of 55.0 kHz. for the subject system.

Figure 3:
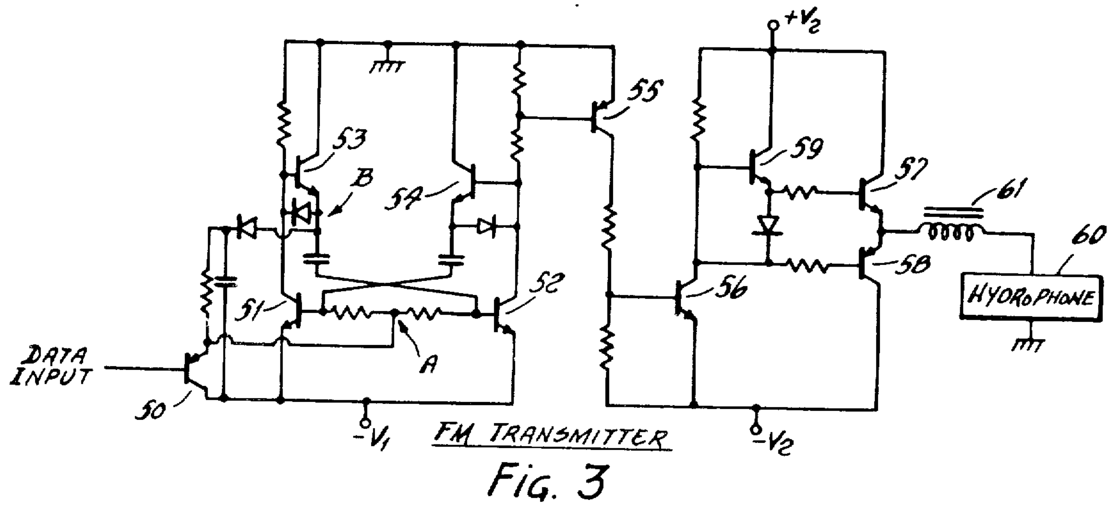
FIG. 3 is a schematic diagram of the FM transmitter shown in FIG. 1.

FIG. 3 shows a schematic diagram of an efficient FM transmitter. Signals from gates 40, 41, 42 and 46 are coupled through an emitter-follower transistor 50 to a voltage-controlled oscillator (an astable multivibrator), formed by transistors 51 and 52. The emitter follower transistor drives point A with the modulating input signal which is adjusted in quiescent value to obtain a 55 kHz. center frequency. The frequency is modulated over a 5.5 kHz. range above and below the carrier frequency. Deviation over this range is achieved with a 0.66-volt peak-to-peak modulating signal. Transistors 53 and 54 reduce the rise time of transistors 51 and 52, thus allowing the multivibrator to operate with only 4 milliwatts of power. Proper starting of the multivibrator is guaranteed by supplying power to the emitter follower transistor 50 which is derived from the multivibrator output at point B. Transistors 55 and 56 amplify the multivibrator output and drive the complementary emitter follower power amplifier transistors 57 and 58. Transistor 59 improves the rise time of the transistor 56 collector signal in a manner similar to that of transistor 53 and 54. The power amplifier drives hydrophone 60 through a 1.8 mh. inductor 61 which resonates with the internal capacity of the hydrophone at 55 kHz. In one configuration, hydrophone 60 is a lead zirconate, thin-walled tube which is molded in polyurethane for protection from the water. With approximately 0.5 watts of power delivered to the hydrophone, battery life in excess of 2 hours is achieved.

THE PRECISION VOLTAGE-CONTROLLED OSCILLATOR

Figure 4:
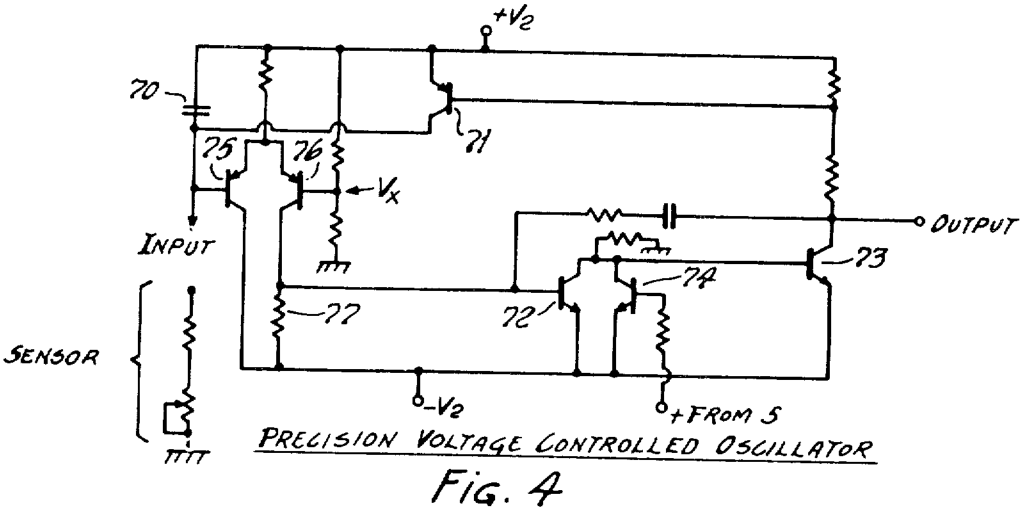
FIG. 4 is a schematic diagram of the precision oscillator shown in FIG. 1.
Figure 5A:
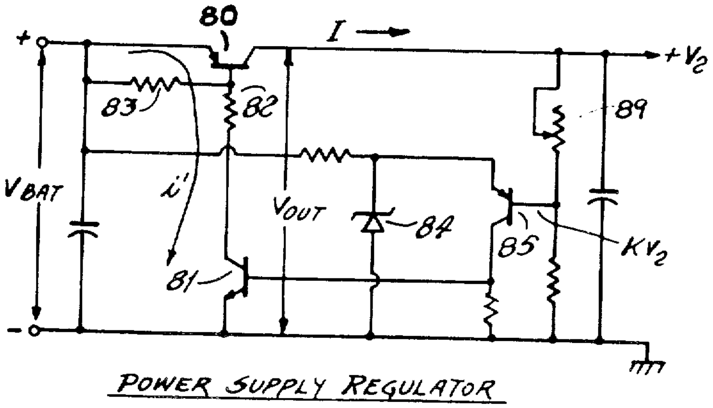
Figure 5B:
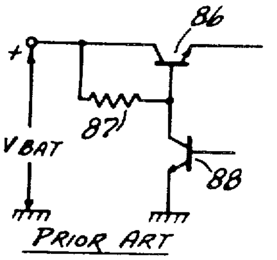

Critical to the reliability of the subject underwater telemetry system is the precision oscillator shown at 25 in FIG. 1 and again in expanded form at FIG. 4. The frequency of this oscillator output must be maintained in a stable known relationship with respect to the value of the thermistor being read out. This must be maintained under mobile conditions where power is supplied by a self-contained battery. The high stability of the oscillator is obtained by the accuracy of the discharge on timing capacitor 70 by shunt transistor 71 and by accurate measurement of the full-charge voltage, $V_x$, by the differential amplifier composed of transistors 75 and 76. This differential amplifier is coupled across a 27K resistor 77 to a one shot multivibrator composed of transistors 72 and 73 which turn on transistor 71 for a short time. This discharges timing capacitor 70. The charge time from 0 to $V_x$ volts across 70 varies as the reciprocal of the sensor resistance. $V_x$ is set at approximately $+V_2/a'$ by the resistive divider. Transistor 74 performs the function of gate 35. Transistor 74 when turned off by "pulse 5" allows the oscillator to function. When 74 is on, the oscillator stops.

The oscillator is designed so that its frequency is varied as $r^{11}$ which is an improvement over sine wave feedback amplifiers which are varied as $r^{11/2}$. This oscillator thus yields twice as much frequency shift for a small change in resistance. Although normal multivibrator circuits offer a $r^{11}$ dependence, they are far less stable because the discharge voltage and the measurement of full charge voltage are sensitive to time, temperature and power supply voltage.

THE POWER SUPPLY REGULATOR

Central to the stability of the disclosed system is a relatively stable voltage from the battery supply shown at 48 in FIG. 1. The regulator for this supply is shown in FIG. *5a* and allows for precise regulation with decreased power drain. With a voltage output of 6.8 volts, the regulator shown schematically in FIG. *5a* produces a stable output when the battery voltage is as low as 7.0 volts. Most regulators fail when the battery falls within 0.6 volts of the regulated output. The regulator itself uses very little of the battery power for its own operation. This is due to the fact that pass transistor 80 is in a normally off configuration with all its base current supplied by transistor 81 instead of being shunted by transistor 88 in the standard configuration shown in FIG. *5b*. Resistor 82 provides a simple way of limiting the maximum amount of current that can be delivered by the regulators to approximately $$\left(\frac{V_{\text{bat}}-V_{be}}{R_{82}}\right)\left(\beta_{80}\right)$$

where $V_{be}$ is the base-to-emitter drop of transistor 80; $R_{82}$ is the resistance in ohms of resistor 82; and $\beta_{80}$ is the current gain of transistor 80. This circuit consequently provides overload protection. It should be noted that pass transistor 80 has a collector towards the load. In this configuration, $V_{battery}$ can be as few as 0.1 or 0.2 volts greater than $V_{out}$ with the circuit functioning properly. In older regulators, the emitter of the pass transistor is towards the load. This is shown in FIG. *5b*. $V_{out}$ is not regulated in this latter configuration if $V_{battery}$ does not at least exceed the desired regulated voltage by $V_{be}+I_L/\beta r$, where $I_L$ is the load current and $\beta$ is the current gain of the pass transistor 86. In this equation, $V_{be}$=0.6 volts for silicon and 0.3 volts for germanium transistors and $r$ is resistor 87 in FIG. *5b*. Thus, improved performance is obtained with the subject configuration. Older regulators do not employ resistor 82 but rather employ a resistor between the positive output terminal of the battery and the base of the "emitter-towards-load" transistor, i.e. resistor 87 in FIG. *5b*. This older configuration results in a high drain on the battery where the present configuration does not. It will be noted that resistor 83 has a resistance much greater than that of resistor 82 so as to carry virtually no current. Resistor 83 guarantees that transistor 80 will shut off under conditions of no load on the regulator and current leakage of transistor 81. In many instances 83 can be omitted. Zener diode 84 and transistors 80, 81 and 85 function with the other components to regulate the output voltage. Zener diode 84 supplies a constant voltage to the emitter of transistor 85. The adjustable divider 89 supplies a fraction K of the output voltage $V_2$ (voltage = $KV_2$) to the base of 85. If $V_2$ falls below $$V_2=\frac{V_{\text{Zener}}-V_{be}}{K}$$

then transistor 85 turns on transistor 81 which increases the base current of transistor 80 resulting in more output current $I_L$ and a greater $V_2$. Thus if $V_2$ differs from the above equality, the error is amplified by transistors 85, 81 and 80 which results in a stable output $V_2$ due to the negative feedback.

Resistor 89 serves to set the output voltage of the regulator to 6.8 volts by adjusting $K$ in the above-mentioned configuration. This regulator has the advantages that there is less wasted power and concomitant longer battery life. There is also provided an automatic short circuit limiting network by resistor 82 and the ability to function properly at lower battery voltages which also extends useful battery life.

THE RECEIVING HYDROPHONE

The receiving hydrophone shown at 11 in FIG. 1 and in an expanded schematic form at FIG. 6 has been made to operate on a single conductor coaxial cable. The center conductor 90 of this cable simultaneously brings DC power down to the hydrophone and brings the received signals up. Consequently, noise is minimized by placing the first amplifier in the hydrophone assembly while at the same time reducing the complexity of cable requirements.

Receiving hydrophone crystal 9 converts the ultrasonic signals in the water to electrical signals. Transformer 97 primary resonates with the internal capacity of 9 at 55 kHz. A turns ratio of 1:6 provides a sixfold increase in voltage output to the first amplifier composed of transistors 95 and 96. The signals are further amplified by the amplifier composed of transistors 93 and 94. The output of this amplifier is tuned to 55 kHz. by capacitor 98 and the primary of transformer 91. Transformer 91 steps down the impedance of the signal to a low value for driving the coaxial cable. The 55 kHz. is applied between the center conductor and the shield of the cable 90 via capacitor 92. DC power for the amplifiers is supplied by the center conductor and is filtered by 92. With this configuration, a single center conductor coaxial cable can be utilized thus effecting a reduction in cable size, weight and cost.

THE CROSSOVER DETECTOR

The zero crossover detector shown at 17 in FIG. 1 and again at FIG. 7 is composed of a differential amplifier having a push-pull output and a rectifier coupled to this output. The amplifier is composed of two transistors 101 and 102 which have inputs coupled to the output of amplifier 14 of FIG. 1. This amplifier has an output available in push-pull form usable by the crossover circuit. The crossover circuit works by combining the outputs of transistors 101 and 102 in a rectifier system composed of transistors 103 and 104. The rectifier generates a series of positive going pulses when the two input signals are equal.

The output pulses of the rectifier can be shut off by a squelch input of −6.8 v. via diode 105 from AM detector 24 of FIG. 1. The pulses are passed through emitter follower 106 and then decoupled by capacitor 110 and resistor 111.

Circuit operation is as follows: If the voltage at the left input is $V_L$ and that at the right input $V_R$, then if $V_L > V_R$ transistor 101 is off and transistor 102 is on. The output is then $V_{cc} - V_{be}$ where $V_{cc} = -6.8$ and $V_{be} = +0.6$. If $V_L < V_R$ transistor 102 is off and 101 on, the output is still $V_{cc} - V_{be} = -6.2$. If $V_L = V_R$ neither transistors 101 and 102 are off and the output is a more positive voltage than when $V_L$ $V_R$. It will be appreciated that transistors 103 and 104 can be replaced with diodes if sufficient power is available from the differential amplifier. In addition, resistors 107 and 108 can be replaced with a constant current source if a constant amplitude output pulse is required when $V_L = V_R$ at values different from zero. In this instance $V_L = -V_R$ since $V_L$ and $V_R$ are push-pull FM signals from tuned amplifier 14. Capacitor 109 and the two resistors 107 and 108 automatically adjust for variations in $V_{be}$ between 101 and 102 by developing a DC voltage across 109 equal to the difference of the $V_{be,s}$. The resultant zero crossing pulse, therefore, is not shifted by $V_{be}$ variations.

What is claimed is:

1. Apparatus for monitoring the body temperature of a freeswimming diver at a location remote from said diver comprising in combination:
   - means for sensing the temperature of said diver at a number of body locations,
     - said means including a plurality of elements each having an electrical resistance the magnitude of which varies in response to changes in temperature;
   - means for producing a first signal having a frequency proportional to the resistance of any of said elements;
   - means for connecting each of said elements to said first signal-producing means during successive time intervals;
   - means for sampling said first signal during each of said time intervals and for generating a series of pulses corresponding to successive samplings,
     - each of said pulses having one of a predetermined number of discrete amplitudes depending on the frequency of the sample;
   - a frequency-modulated transmitter normally producing an output signal at a center frequency which falls within a region between the upper audio and the lower radio frequency bands;
   - means for coupling said series of pulses to said transmitter so as to shift the frequency of its output signal from said center frequency by an amount and in a direction depending upon the relative amplitudes of the individual pulses in said series;
   - means for radiating said output signal into the water surrounding said diver in an omnidirectional radiation pattern;
   - means at said remote location for detecting the signal radiated from said diver and for producing a demodulated signal having an amplitude proportional to the frequency of said radiated signal; and
   - means for recording the amplitude of said demodulated signal so as to provide an indication of the body temperature of said diver at said number of body locations.

2. The apparatus as recited in claim 1 wherein said successive time intervals are equal in length; wherein said first signal is sampled during a predetermined portion of each equal time interval; and wherein each pulse in said series of pulses has one of a predetermined number of discrete amplitudes depending on the number of oscillations of said first signal occurring in said predetermined portion.

3. The apparatus as recited in claim 1 wherein said sampling and generating means includes:
   - means for producing a series of clock pulses;
   - a multiple level ring counter coupled at one end to said clock-pulse-producing means,
     - said counter having a series of output terminals corresponding in number to the number of levels in said ring counter;
   - a plurality of binary counters cascaded in series,
     - said plurality being one less than the number of levels in said ring counter;
   - switching means interposed between said first signal-producing means and the first binary counter of said series for permitting signals produced by said means to be coupled to said series of cascaded counters during the appearance of a clock pulse at the first of said series of output terminals;
   - a like plurality of binary-to-octal converters,
     - different converters being coupled to different binary counters for producing pulses corresponding in amplitude to the number in the binary counter to which it is coupled at their respective outputs;
   - a like plurality of gates,
     - the inputs to different gates being coupled to the outputs of different converters and the outputs of said gates being coupled together to form a single output terminal,
   - the gate corresponding to the first of said series of binary counters being actuated by the appearance of a clock pulse at the second of said series of output terminals;
   - the subsequent gates corresponding to the subsequent binary counters in said series of cascaded counters being actuated by the appearance of clock pulses at output terminals subsequent to said second output terminal such that said gates connect the outputs of said converters to said single output terminal in successive time intervals whereby a series of amplitude-modulated pulses are produced at said single output terminal; and
   - a reset pulse generator having an output coupled to each of said binary counters for resetting each binary counter after the appearance of a clock pulse at the last of said series of output terminals.

4. The apparatus as recited in claim 1 wherein said demodulating means includes:
   - means for sensing the zero crossovers of the oscillations in the signal radiated from said diver and detected at said remote location and for producing a pulse for every zero crossover sensed; and
   - means for generating an output pulse having an amplitude proportional to the number of pulses produced by said zero crossover sensing means in a predetermined time period, whereby a number of output pulses so generated constitutes said demodulated signal.

5. The apparatus as recited in claim 1 wherein said apparatus includes means for providing a regulated source of electrical power, said means including:
   - a voltage regulator having first and second input terminals and first and second output terminals in which said second output terminal is connected to said second input terminal;
   - a first transistor having its emitter coupled to said first input terminal and its collector coupled to said first output terminal;
   - a resistive element coupled at one side to the base of said first transistor;
   - a second transistor having its collector connected to the other side of said resistive element and having its emitter coupled to said second input terminal; and
   - means coupled to the base of said second transistor for permitting electric current to increase therethrough whenever the voltage appearing across said output terminals drops below a predetermined voltage such that said first transistor is made to pass more current to said first output terminal whenever its base is connected through said resistive element and said second transistor to said second input terminal.